March 21, 1961  F. DRAUDEN ET AL  2,975,578
MOWING, CHOPPING AND SPREADING APPARATUS
Filed May 5, 1958  3 Sheets-Sheet 3
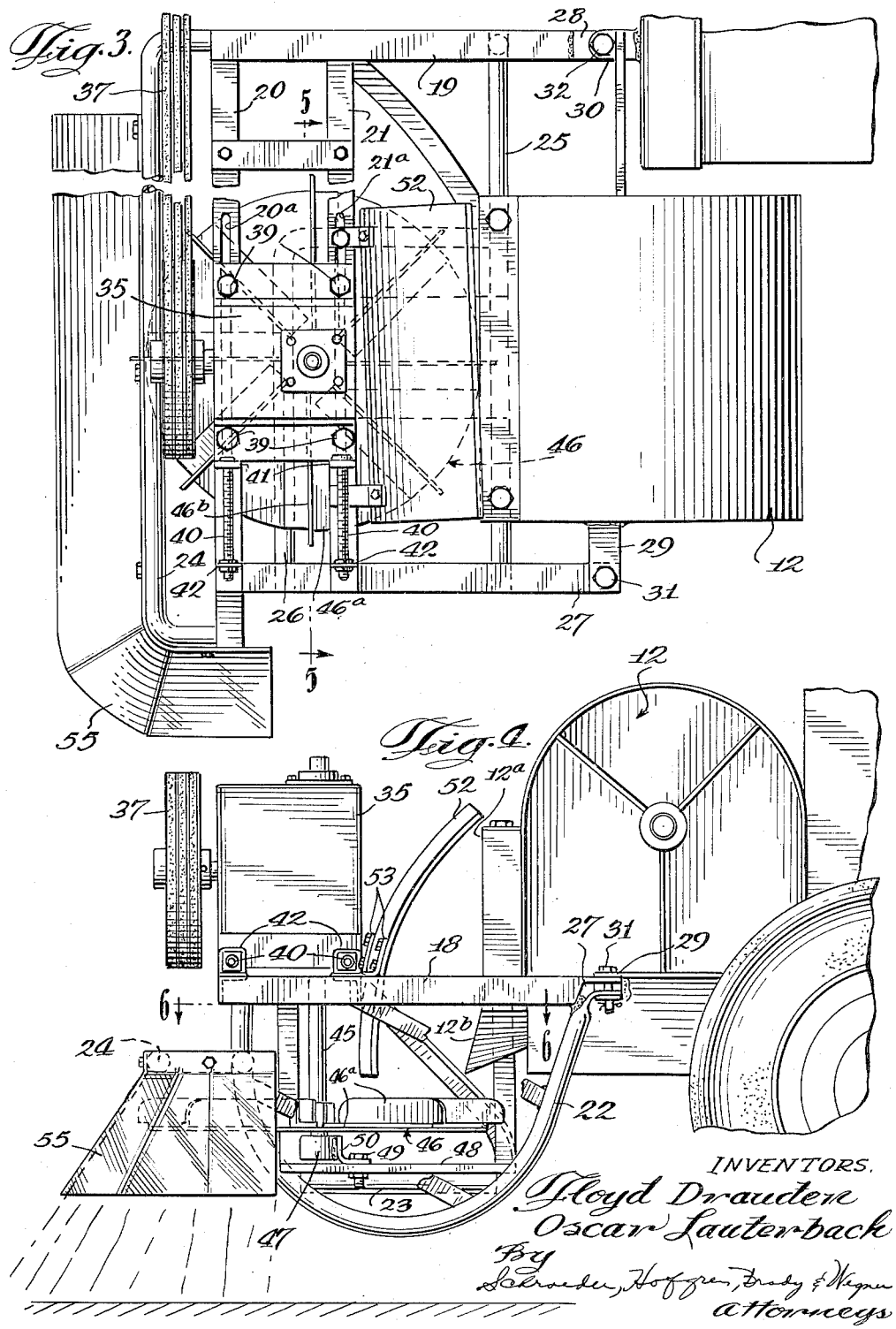
INVENTORS.
Lloyd Drauden
Oscar Lauterback United States Patent Office 2,975,578
Patented Mar. 21, 1961

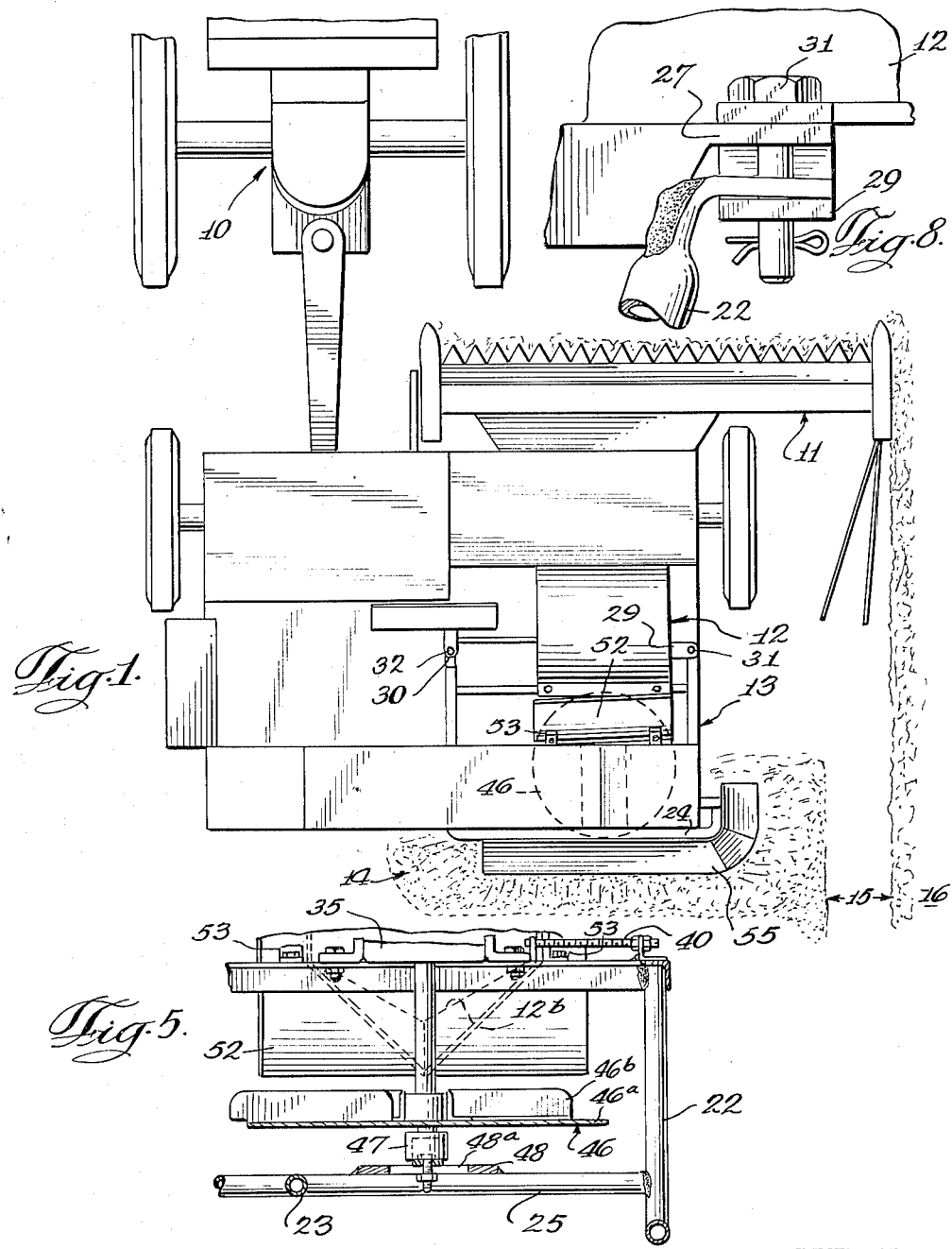

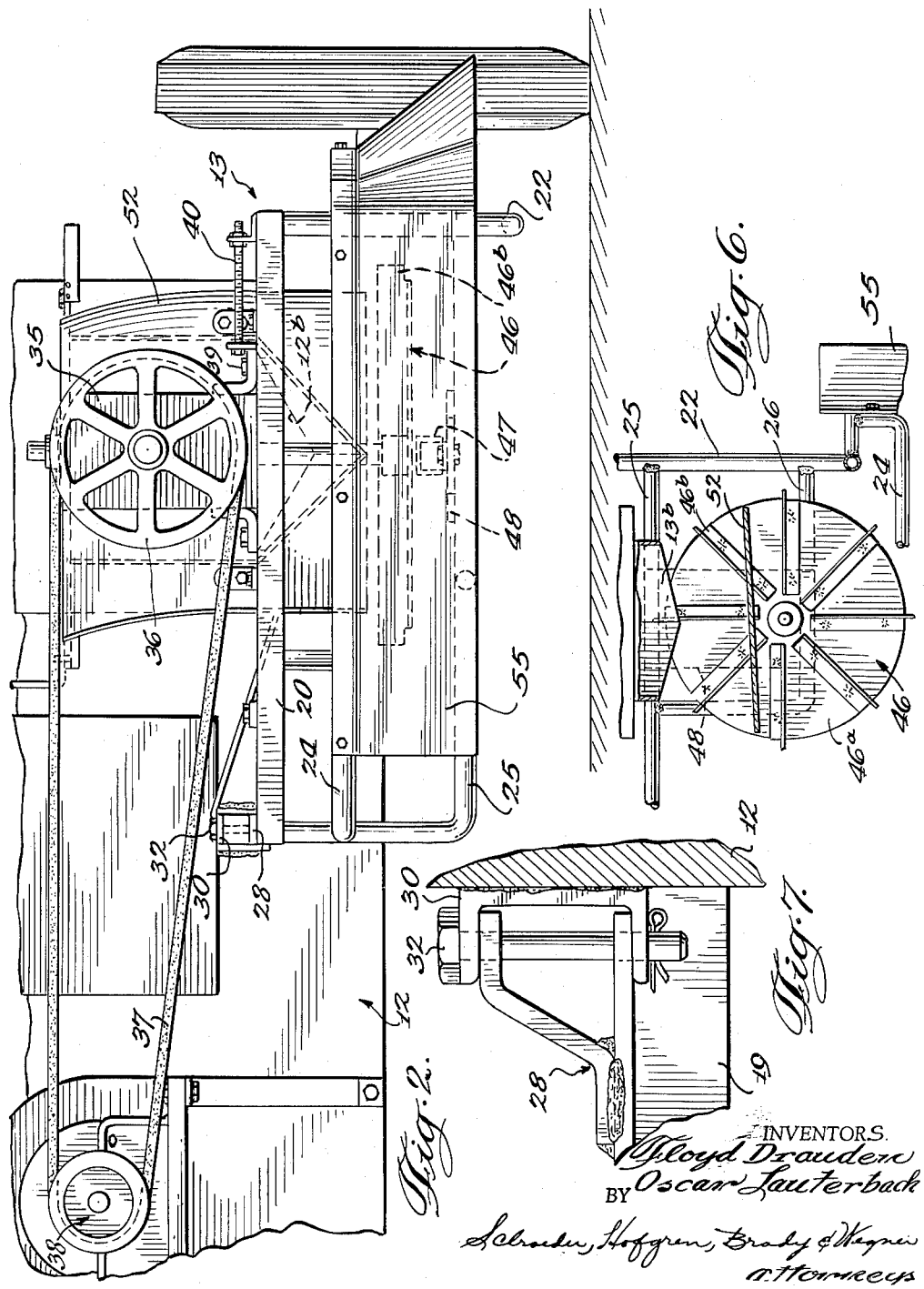

2,975,578
MOWING, CHOPPING, AND SPREADING APPARATUS

Floyd Drauden, Plainfield, Ill. (Rte. 1, Box 23, Minooka, Ill.), and Oscar Lauterbach, Rte. 3, Plainfield, Ill.

Filed May 5, 1958, Ser. No. 733,117

4 Claims. (Cl. 56—23)

This invention relates to a spreader or distributor particularly designed for use in spreading chopped green material on a field.

An increasingly popular method of enriching farm land is to grow a crop, such as clover, and then plow it back into the ground where it decays, adding valuable organic matter to the soil. The decaying process is accelerated if the plant material is comminuted or chopped before being returned to the ground; and devices are available for performing the chopping operation in the field. However, such devices with which we are familiar are not equipped for returning the chopped material to the ground in a uniform manner. Rather, they generally have a provision for delivering the chopped material to a centrifugal blower which blows the chopped material up into a wagon, as would be done with silage. If the material is allowed to fall from the chopper directly back to the ground, it is merely piled in a concentrated windrow and cannot be utilized efficiently. If a centrifugal blower is used to blow the chopped material back onto the ground instead of into a wagon, it discharges material high up in the air, resulting in an uneven covering of the ground and, if the wind is from the wrong direction, blowing it over the operator of the equipment.

The material chopped is generally green, as it is preferably cut just before chopping, and it is discharged from the chopper in rather tightly packed lumps. Unless the material is properly handled, it will clog the spreader device, and will not be distributed evenly.

A principal object of this invention is to provide a distributor which is usable with a chopper to return chopped material to the ground in an efficient manner.

One feature of the invention is the provision of a spreader for chopping moist material including a portable carrier, a rotating material distributor or fan on said carrier, and means for directing chopped material to the distributor. Another feature is the provision of a deflector or skirt for directing material from the distributor fan to the ground.

A further feature is that the distributor is combined with a cutter, for use with standing material, as a crop of clover, and the deflector or skirt is arranged so that the chopped material is distributed back onto an area of ground substantially equal to the area from which it was cut.

Yet another feature is that the chopped material is directed to the distributor or fan in such a manner that clogging is prevented; and in particular with a fan rotating in a generally horizontal plane and supported with a generally vertically extending shaft, the chopped material is directed to an area of the fan spaced away from the shaft to keep it from lodging against and wrapping around the shaft.

Still a further feature is that the shaft extends from a drive through the distributor fan and is provided with an adjustable, self-aligning bearing at the opposite end.

And another feature is the provision, in combination with a chopper having a rearwardly facing discharge opening spaced above the ground, of a frame detachably secured to the cover, a distributor or fan mounted on the frame and positioned rearwardly of and below the discharge opening of the chopper, and means for rotating the distributor.

Further features and advantages of the invention will readily be apparent from the following specification and from the drawings, in which:

Figure 1 is a plan view of an apparatus including a tractor, a cutter, a chopper, and a distributor embodying the invention;

Figure 2 is a rear elevation of the distributor;

Figure 3 is a top plan view of the distributor;

Fig. 4 is an end view of the distributor, looking from the right of Figure 2;

Figure 5 is a vertical section taken generally along line 5—5 of Figure 3;

Figure 6 is a transverse section taken generally along line 6—6 of Figure 4; and Figures 7 and 8 are detail views of the mounting connection of the distributor frame or carrier on the chopper.

In the embodiment of the invention illustrated in the drawings, the distributor is used in combination with a cutter or mower which cuts the standing crop for delivery to a chopper. Accordingly, the distributor is required to handle chopped green material. Of course, the distributor could also be used where the material has been previously cut and gathered into windrows. As a result of the novel features of the distributor construction which prevent clogging of the distributor and insure even spreading of the green chopped material, the distributor can also be used when the material, either standing uncut or previously cut and gathered into windrows, is wet, as from early morning dew or rain. The term "moist" will be used hereinafter to describe green or wet material, or both.

Turning now to the drawings, and particularly to Figure 1, a tractor 10 is illustrated pulling an assembly including a mower 11, a chopper 12 and a distributor 13. As the tractor travels through the field, the standing crop, as clover, cut by the mower 11 is fed to chopper 12 where it is reduced to relatively small pieces. The chopped material is discharged from the chopper to distributor 13 which spreads it back onto the ground, covering an area indicated generally as 14. It will be noted that the area 14 has substantially the same width as the length of the cutter bar of mower 11, so that the chopped material is returned to generally the same area from which the standing crop was cut. However, the area to which the material is returned is offset from the mowed swath, as indicated at 15 to prevent the chopped material from mixing with the uncut crop as 16. The distance 15 is preferably of the order of one foot.

Turning now to Figures 2–5, it will be seen that the distributor has a frame with an upper portion including rearwardly extending angle bars 18 and 19 joined by transversely extending rails 20 and 21, and a lower portion including tubular members 22, 23, 24, 25 and 26. End portions 27 and 28 of the frame are received in mounting brackets 29 and 30 on the frame of chopper 12 and are removably secured thereto, as by pins 31 and 32.

A gear box 35 is mounted on rails 20 and 21 and has a pulley 36 on the rear surface thereof, which is connected by drive belts 37 with a power takeoff 38 on the chopper 12. The gear box 35 is secured to rails 20 and 21 by bolts 39 which are received in slots 20a and 21a formed in the rails. The position of gear box 35 may be adjusted, and the tension in drive belts 37 varied by moving the gear box back and forth along the rails 20 and 21, when the bolts 39 are loosened. To facilitate this operation, a pair of adjusting bolts 40 are connected between angles 41 secured to the gear box and angles 42 secured to frame member 27.

Depending from gear box 35 is a generally vertically extending drive shaft 45 which has mounted thereon a distributor fan 46. The fan itself includes a generally circular plate 46a with a plurality of angle bars 46b secured to the upper surface in a uniform, radial, fan-like arrangement. The lower end of shaft 45, below the distributor fan 46, is received in a self-aligning bearing 47. A bearing mounting plate 48 is carried between lower frame members 25 and 26 and has a slot 48a which receives a bolt 49 passed through an angle bracket 50 secured to bearing 47. When the gear box 35 is moved, bolt 49 is loosened and shaft 45 and bearing 47 automatically assume a desired aligned position. Bolt 49 is then tightened to secure the bearing in place.

In one embodiment the fan 46 has a diameter of two feet and is operated at a speed of 650 revolutions per minute. There are six angle bars 46a, each two inches high and extending beyond the edge of the circular plate 46a about one and one half inches. The fan is preferably as close to the ground as practicable, and in the illustration given above is about one foot high.

The discharge opening 12a in the rear surface of chopper 12 has an upper portion generally rectangular in shape, with a lower triangular portion 12b. The distributor fan 46 is located slightly below the bottom of the discharge opening and rearwardly thereof with the lower portion of the discharge opening extending past the outer edge of the fan blade. The distributor is preferably aligned with the discharge opening so that the drive shaft 45, and the center of the distributor fan are directly behind the center of the discharge opening. The chopped material delivered from the chopper travels in a generally radial direction with respect to the distributor fan. A curved deflector plate 52 is arranged in the path of the discharged material and directs it downwardly to the upper surface of the fan 46. It will be noted that the deflector plate is interposed between the discharge opening 12a and the shaft 45 of the fan so that the chopped material is directed to an area spaced outwardly from the shaft. This prevents the material from wrapping around the shaft and interfering with efficient distribution or spreading. Deflector plate 52 is mounted at which may be termed a leading angle with respect to the distributor fan 46. That is, the deflector is not exactly at a right angle to the direction of movement of the discharged chopped material, but is angled slightly, as best seen in Figure 6, to feed the material onto the distributor in the direction of a counterclockwise rotation thereof. In somewhat more mathematical language, the angle between the plate 52 and the direction of movement of the chopped material is greater than 90°, in the direction of rotation of the fan (on the left as viewed from above in Figure 6). With this arrangement the deflector plate 52 not only directs the chopped material downwardly onto the surface of the distributor fan, but also imparts to it a component of movement in the direction of rotation of the fan. Curved deflector plate 52 is provided with a pair of straps 53 by which it is mounted on transversely extending rail 21. The bolt holes in the straps are preferably slotted to permit adjustment of the position of the deflector plate.

Secured to the lower frame portion member 24 is an outwardly flared skirt 55 which surrounds the rear and a portion of the right side (when viewed from the rear) of the distributor fan and directs the chopped material discharged from the fan downwardly onto the ground. The flare of the right end portion is particularly important in determining the offset spacing distance 15 (Figure 1) to prevent distributed chopped material from being thrown into the uncut standing crop. The skirt 55, together with various portions of the frame assembly, acts as guards to prevent those working around the distributor from being injured by the fan.

In some situations, as where the apparatus is used with material which has previously been mowed and is lying in a windrow, the skirt 55 may be removed to permit a wider distribution of the material.

Of particular importance in the operation of the device is the action of the deflector plate 52 in directing the chopped material to a desired portion of the distributor fan surface, spaced from the center or shaft 45 on which the fan is mounted. In addition to preventing an accumulation of chopped material wrapped about the shaft, the portion of the distributor fan on which the chopped material impinges is travelling at a relatively high lineal rate of speed so that the tendency of moist chopped material to gather in lumps is overcome by the beating action of the bars or ribs 46b. The deflector skirt 55 shields the distributor fan 46 and permits operation under windy conditions, without affecting uniform distribution of the chopped material.

While we have shown and described certain embodiments of our invention, it is to be understood that it is capable of many modifications. Changes therefore, in the construction and arrangement may be made without departing from the spirit and scope of the invention as disclosed in the appended claims.

We claim:

1. Apparatus for cutting standing green material and spreading the same on the ground in a preselected uniform distribution, comprising: a mower having a preselected width; means operatively associated with said mower for chopping the mowed material; a horizontally extending plate; means rotating the plate about a vertical axis; a plurality of elongated elements on the upper surface of the plate extending radially to said axis; a guide operatively associated with the chopper and plate directed toward said plate at a point spaced at a substantial distance from said axis for directing chopped material from the chopping means onto said plate whereby said elements first beat said material to break up clumps thereof and secondly throw the broken up material laterally outwardly to distribute the same; and a skirt operatively associated with said plate deflecting the throw material downwardly and co-ordinated with the pattern of distribution of the thrown material provided by the elongated elements to distribute the material to an area of the ground substantially equal in width to the width of the mower and offset a preselected distance from a line defined by one edge of the mower extending perpendicular to the width thereof.

2. The apparatus of claim 1 wherein the guide extends at an angle to the vertical and in the direction of movement of the plate at said point.

3. The apparatus of claim 1 wherein the rotating means comprises an axial shaft depending from a gear box to be secured to and extend through the plate, and a bearing journalling the lower end of the shaft below the plate.

4. The apparatus of claim 1 wherein the skirt includes a first portion extending horizontally parallel to the plate diametrically opposite said point toward which the guide is directed, and a second portion extending perpendicular to the first portion intermediate said plate axis and said line defined by one edge of the mower.

References Cited in the file of this patent

UNITED STATES PATENTS

| | | |
|---|---|---|
| 2,243,996 | Baughman | June 3, 1941 |
| 2,631,418 | Ronning | Mar. 17, 1953 |
| 2,723,860 | Weeks | Nov. 15, 1955 |
| 2,745,237 | Elliott | May 15, 1956 |